United States Patent [19]

Irick, Jr. et al.

[11] 4,164,494

[45] Aug. 14, 1979

[54] PIPERIDINYL PHOSPHATE ULTRAVIOLET STABILIZERS FOR ORGANIC COMPOSITIONS

[75] Inventors: Gether Irick, Jr.; Richard H. S. Wang, both of Kingsport, Tenn.

[73] Assignee: Eastman Kodak Company, Rochester, N.Y.

[21] Appl. No.: 906,398

[22] Filed: May 16, 1978

[51] Int. Cl.$^2$ ............................................... C08K 5/52
[52] U.S. Cl. ...................... 260/45.75 R; 260/45.75 N; 260/45.75 K; 260/45.75 W; 260/45.8 N; 260/45.7 P; 546/25; 546/16; 546/6
[58] Field of Search ................ 260/45.8 NP, 45.75 R, 260/45.75 N, 45.75 K, 45.75 W, 293.9, 293.63, 293.64, 45.7 P

[56] References Cited

U.S. PATENT DOCUMENTS

| | | | |
|---|---|---|---|
| 3,640,928 | 2/1972 | Murayama et al. | 260/23 XA |
| 4,001,181 | 1/1977 | Ramey et al. | 260/45.75 N |
| 4,046,737 | 9/1977 | Holt et al. | 260/45.8 N |
| 4,056,507 | 11/1977 | Ramey et al. | 260/45.75 N |

*Primary Examiner*—V. P. Hoke
*Attorney, Agent, or Firm*—Clyde L. Tootle; Daniel B. Reece, III

[57] ABSTRACT

The invention relates to piperidinyl phosphates which have been found to be effective ultraviolet stabilizers. The invention also relates to piperidinyl phosphate salts which have been found to be effective ultraviolet stabilizers. The invention also relates to ultraviolet degradable organic compositions containing a stabilizing amount of the piperidinyl phosphates or salts thereof to prevent such degradation. These stabilizers are effective in the presence of other additives commonly employed in polymeric compositions including, for example, pigments, colorants, fillers, reinforcing agents and the like. These ultraviolet stabilizers may also be incorporated into the organic compositions in the polymer melt or dissolved in the polymer dope, or coated on the exterior of the molded article, film or extruded fiber.

15 Claims, No Drawings

PIPERIDINYL PHOSPHATE ULTRAVIOLET STABILIZERS FOR ORGANIC COMPOSITIONS

This invention relates to piperidinyl phosphates or salts thereof useful as ultraviolet stabilizers and their use in organic compositions. More particularly, the invention relates to piperidinyl phosphates or salts thereof and the stabilization of ultraviolet degradable organic compositions against deterioration resulting from the exposure to such radiations with such piperidinyl phosphates or salts thereof.

The degradative effects of ultraviolet light on various organic compositions is well known in the art. The photo-deterioration or degradation is of particular concern with organic photo-degradable compositions which are exposed to ultraviolet light, such as sunlight, for long periods of time. One group of such photo-degradable organic compositions are polymeric compositions such as polyolefins, polyesters, polyurethanes and the like. On exposure to sunlight for extended periods of time, these polymeric compositions degrade and their physical properties are reduced thereby rendering such polymeric compositions less useful or useless for most applications. Therefore, considerable effort has been directed to providing a solution to the photodegradation problem of polymeric compositions. As a result of this effort, there have been discovered many additives and stabilizers which improve the stability of polymeric compositions.

While there are many additives, stabilizers and mixtures thereof which are known in the art to improve the ultraviolet light stability of organic compositions, there is a need in the art for more efficient and effective stabilizers to prevent the photo-degradation of organic compositions susceptible to photo-degradation. Therefore, to provide a more effective and efficient ultraviolet stabilizer for organic compositions susceptible to such degradation would be an advance in the state of the art.

It is, therefore, an object of the present invention to provide more effective and efficient ultraviolet light stabilizer compositions.

Another object of the present invention is to provide useful compositions characterized by improved resistance to ultraviolet degradation and deterioration.

It is still another object of the present invention to provide compositions containing piperidinyl phosphate compositions which are resistant to ultraviolet degradation.

It is a still further object of this invention to provide processes for improving the resistance of organic materials to deterioration and degradation by actinic radiation and especially ultraviolet radiation.

It is a still further object of this invention to provide compositions and processes for improving the resistance of organic materials to deterioration and degradation by ultraviolet radiations, including short wavelength visible radiations.

Further objects and advantages of the invention will be apparent to those skilled in the art from the accompanying disclosure and claims.

In accordance with the present invention, piperidinyl phosphate compositions are provided which are useful as ultraviolet stabilizers. These organic compositions contain at least one piperidinyl group containing composition connected to a phosphoric acid moiety. The piperidinyl phosphate compositions of the present invention have the following structures:

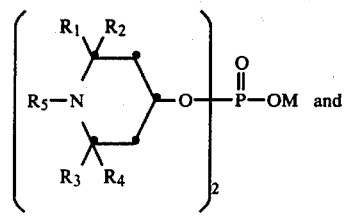 and

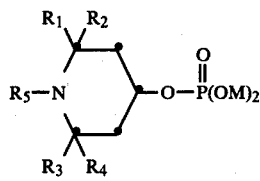

$R_1$ and $R_2$ are each alkyl having 1–6 carbons; $R_3$ and $R_4$ are each alkyl having 1–6 carbons or together with the carbon to which they are bound form a cyclopentyl or cyclohexyl ring, which is unsubstituted or substituted with a methyl group; and $R_5$ is hydrogen, oxy, alkyl having 1 to 12 carbon atoms, β-methoxyethyl, alkenyl having 3 or 4 carbon atoms, propargyl, benzyl or alkyl substituted benzyl; and M is either hydrogen or a metal ion selected from the group consisting of Li, Na, K, Mg, Ca, Ba, Mn, Co, Ni, Sn, Zn, Ce, and the amount of hydrogen for M can vary from zero to 100%. Preferably, the amount of M is from 67 to 100 mole percent hydrogen. Since the valence of M for these metals is not always one, it is understood that the valency requirements of M may be filled by a suitable anion such as acetoxy, benzoyloxy, chloro and the like.

Suitable piperidinyl groups are 2,2,6,6-tetramethylpiperidin-4-yl, 1,2,2,6,6-pentamethylpiperidin-4-yl, 1-oxo-2,2,6,6-tetramethylpiperidin-4-yl and the like.

The piperidinyl phosphate compositions can be added to organic compositions which are susceptible to ultraviolet degradation. Such compositions include, for example, polymeric compositions such as polyolefins such as, for example, high, medium and low density polyethylene, polypropylene, polybutene and the like; polyamides such as N-methoxymethyl polyhexamethylene adipamide and the like; polycarbonates; polyvinyl chlorides and copolymers; cellulose esters; acrylic/-butadiene/styrene plastic; polyacrylics such as methyl methacrylate; polystyrene; gelatin; vinylidene chloride copolymers such as vinylidene chloride/vinyl acetate copolymers; ethylene vinyl acetate copolymers; cellulose ethers such as methyl cellulose; polyvinyl esters such as polyvinyl acetate; polyethylene oxide; polyvinyl acetals; polyformaldehydes; and polyurethanes. Such compositions also include natural and synthetic rubbers, such as polybutadiene, and unsaturated organic compositions such as oils and the like, as well as compositions containing such organic compositions.

The piperidinyl phosphate compositions, as effective ultraviolet stabilizers, are generally used in an amount of from 0.01% to 10%, by weight, based on the weight of the organic material to which they are added. While a detectable amount of ultraviolet stabilization may be obtained with amounts less than 0.01%, this amount of stabilization would be of little practical utility in a commercial application. Moreover, while amounts greater than 10%, by weight, provide effective ultraviolet stability, such concentrations are undesirable because of cost and the deleterious effect which such concentrations may have on the mechanical properties of the organic composition in which the stabilizer is incorporated. Preferably, the stabilizer is used in an amount of from about 0.1 to about 3%, by weight. For example, an amount of 0.5% by weight, of the stabilizer effectively stabilizes TiO$_2$-pigmented polypropylene plastic compositions.

The ultraviolet stabilized organic compositions of the present invention may also contain other additives, pigments, colorants, stabilizers and the like. For example, polymeric compositions, such as polyolefins, may also contain and generally do contain other additives such as white or colored pigments or colorants, antioxidants, plasticizers, flow aids, processing aids, polymeric modifiers and the like.

These novel piperidinyl phosphate ultraviolet stabilizers may be incorporated into organic compositions by melt-blending, by dissolving in a common solvent, by emulsification, or may be added onto the surface of an organic plastic material prior to being molded into a suitable object. These materials can also be added to coatings and the like which can be applied to the surface of a molded object. One of the novel features of the present piperidinyl phosphate ultraviolet stabilizers is that the pH of the compositions is controllable. For example, the preparation of a salt or partial salt of the compositions changes the pH of the stabilizers. This can be important, for example, with an emulsifiable polymer that requires a base medium. The addition of an acid stabilizer could break up the emulsion and be detrimental. Therefore, the acidity of the stabilizer can be changed by formation of a salt. Also, the solubility of the compositions in organic solvents and aqueous mediums can be modified by converting the acid to a salt, for example.

This invention will be further illustrated by the following examples although it will be understood that these examples are included merely for purposes of illustration and are not intended to limit the scope of the invention.

EXAMPLE 1

Preparation of mixed mono- and di-2,2,6,6-tetramethyl-4-piperidinyl hydrogen phosphate (I). A mixture of phosphorus pentoxide (14.2 g., 0.1 mole), and 2,2,6,6-tetramethyl-4-piperidinol (47.1 g., 0.3 mole) in 500 ml. of glyme was refluxed for 6 hours. After removal of solvent, the residue was obtained as product I (quantitative yield).

EXAMPLE 2

Preparation of mixed 2,2,6,6-tetramethyl-4-piperidinyl hydrogen phosphates and its zinc salt (II). A mixture of I (61.3 g.) and zinc acetate (9.2 g.) was refluxed in 500 ml. of dichloromethane for 4 hours. The product II was obtained after removing solvent by evaporation.

EXAMPLE 3

Preparation of mixed 2,2,6,6-tetramethyl-4-piperidinyl hydrogen phosphates and its cerous salt (III). The product III was obtained in the same manner is described in Example 2 for product II.

EXAMPLE 4

Preparation of mixed 2,2,6,6-tetramethyl-4-piperdinyl hydrogen phosphate and its nickel salt (IV). A mixture of I (61.3 g.) and nickelous acetate (17.5 g.) in 500 ml. dichloromethane was refluxed for 4 hours. Approximately 200 ml. of solvent was removed by distillation and the product (IV) was isolated by filtration (greenish-yellow solid).

EXAMPLE 5

Preparation of mixed 2,2,6,6-tetramethyl-4-piperidinyl hydrogen phosphate and its potassium salt (V). A mixture of phosphorus pentoxide (14.2 g, 0.1 mole) and potassium salt of 2,2,6,6-tetramethyl-4-piperidinol (58.5 g, 0.3 mole) in 500 ml of toluene was heated at 80° C. for 6 hours. After removal of solvent, the residue was obtained as product V.

EXAMPLES 6, 7, 8 and 9

The products containing the sodium salt (VI), and lithium salt (IX) were prepared by the general procedure used for Example 5.

The products containing the magnesium salt (VII) and barium salt (VIII) were prepared by the general procedure used for Example 2.

EXAMPLES 10, 11 and 12

The products containing the maganese (X), cobalt (XI), and tin (XII) salts were prepared by the general procedure described in Example 4.

EXAMPLE 13

The ultraviolet stabilization provided by the piperidinyl phosphates of the present invention is shown in TiO$_2$-pigmented polypropylene in Table 1.

Table 1

Effectiveness of Ultraviolet Stabilizers in
TiO$_2$-Pigmented Polypropylene Film Exposed
In Uvatest Weathering Device

| Compound (0.5%) | Time to Embrittlement (Hours) |
|---|---|
| none | 300 |
| I | 3000 |
| II | 3200 |
| III | 3200 |
| IV | 3500 |
| V | 2900 |
| VI | 2900 |
| VII | 3000 |
| VIII | 3000 |
| IX | 3100 |
| X | 2400 |
| XI | 3400 |
| XII | 3100 |
| I + 0.5% Tinuvin 328[1] | 3900 |
| II + 0.5% Tinuvin 328 | 3700 |
| I + 0.5% Ferro AM-340[2] | 4000 |

[1]2-(2H-benzotriazol-2-yl)-4,6-di-t-pentylphenol.
[2]2,4-di-t-butylphenyl 3,5-di-t-butyl-4-hydroxybenzoate.

Table 2

Effectiveness of Ultraviolet Stabilizers in
Polyurethane Coating on Steel Panels After
QUV Cyclic Environmental Tester Exposure

| Compound (1%) | % Gloss Retained After 500 Hrs. Exposure |
|---|---|
| None | 12 |
| I | 75 |
| II | 68 |
| III | 72 |
| IV | 80 |
| V | 79 |
| VI | 67 |
| VII | 74 |
| VIII | 80 |
| IX | 84 |
| X | 75 |

Table 2-continued

Effectiveness of Ultraviolet Stabilizers in
Polyurethane Coating on Steel Panels After
QUV Cyclic Environmental Tester Exposure

| Compound (1%) | % Gloss Retained After 500 Hrs. Exposure |
|---|---|
| XI | 72 |
| XII | 71 |
| I + 1% Tinuvin 328 | 90 |
| I + 1% Ferro AM-340 | 86 |
| II + 1% Tinuvin 328 | 86 |

These piperidinyl phosphate compositions find particular utility as ultraviolet stabilizers in organic compositions requiring ultraviolet stability. Such compositions include polymeric compositions such as, for example, polyurethanes, poly-α-olefins, polyamides, acrylics, cellulose esters and the like as well as molded or shaped articles, film, and coatings formed from such materials and the like. Such compositions also include natural and synthetic rubbers, such as natural rubber, as well as organic materials such as oils, fats, and unsaturated organic materials and materials having such materials contained therein such as paints, varnishes, cosmetics and the like.

The invention has been described in detail with particular reference to preferred embodiments thereof, but it will be understood that variations and modifications can be effected within the spirit and scope of the invention.

We claim:

1. An organic composition susceptable to ultraviolet light degradation stabilized against such degradation with a stabilizing amount of a mixture of piperidinyl phosphates having the formula:

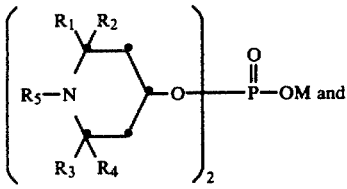

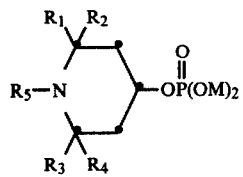

$R_1$ and $R_2$ are each alkyl having 1-6 carbons; $R_3$ and $R_4$ are each alkyl having 1-6 carbons or together with the carbon to which they are bound form a cyclopentyl or cyclohexyl ring, which is unsubstituted or substituted with a methyl group; and $R_5$ is hydrogen, oxy, alkyl having 1 to 12 carbon atoms, β-methoxyethyl, alkenyl having 3 to 4 carbon atoms, propargyl, benzyl or alkyl substituted benzyl, and M is either hydrogen or a metal ion selected from the group consisting of Li, Na, K, Mg, Ca, Ba, Mn, Co, Ni, Sn, Zn, and Ce, wherein at least one M radical is one of said metal ions and when the valence of M is greater than one, the available valency requirements of M are filled by a suitable anion selected from the group consisting of acetoxy, benzoyloxy, and chloro.

2. An organic composition according to claim 1 wherein said piperidinyl phosphates have the formula:

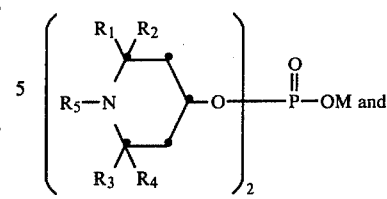

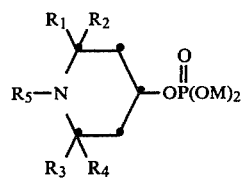

$R_1$ and $R_2$ are each alkyl having 1-6 carbons; $R_3$ and $R_4$ are each alkyl having 1-6 carbons or together with the carbon to which they are bound form a cyclopentyl or cyclohexyl ring, which is unsubstituted or substituted with a methyl group; and $R_5$ is hydrogen, oxy, alkyl having 1 to 12 carbon atoms, β-methoxyethyl, alkenyl having 3 or 4 carbon atoms, propargyl, benzyl or alkyl substituted benzyl, and M is a metal ion selected from the group consisting of Li, Na, K, Mg, Ca, Ba, Mn, Co, Ni, Sn, Zn, Ce, and when the valence of M is greater than one, the available valency requirements of M are filled by a suitable anion selected from the group consisting of acetoxy, benzoyloxy, and chloro.

3. An organic composition according to claim 2 wherein said piperidinyl phosphates have the formula:

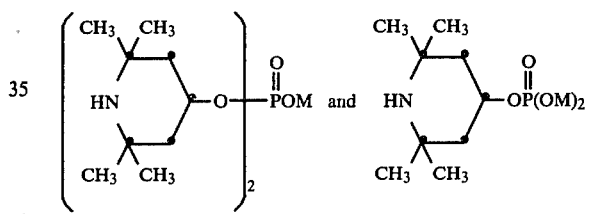

wherein M is a metal ion selected from the group consisting of Li, Na, K, Mg, Ca, Ba, Mn, Co, Ni, Sn, Zn and Ce and when the valence of M is greater than one, the available valency requirements of M are filled by a suitable anion selected from the group consisting of acetoxy, benzoyloxy, and chloro.

4. An organic composition according to claim 3 wherein said metal ion is lithium.

5. An organic composition according to claim 3 wherein said metal ion is sodium.

6. An organic composition according to claim 3 wherein said metal ion is potassium.

7. An organic composition according to claim 3 wherein said metal ion is magnesium.

8. An organic composition according to claim 3 wherein said metal ion is calcium.

9. An organic composition according to claim 3 wherein said metal ion is barium.

10. An organic composition according to claim 3 wherein said metal ion is manganese.

11. An organic composition according to claim 3 wherein said metal ion is cobalt.

12. An organic composition according to claim 3 wherein said metal ion is nickel.

13. An organic composition according to claim 3 wherein said metal ion is tin.

14. An organic composition according to claim 3 wherein said metal ion is zinc.

15. An organic composition according to claim 3 wherein said metal ion is cerium.

* * * * *